United States Patent

Depase et al.

(10) Patent No.: US 7,754,045 B2
(45) Date of Patent: Jul. 13, 2010

(54) METHOD AND TOOLS FOR FABRICATING COMPOSITE BEAMS

(75) Inventors: Edoardo P. Depase, Seattle, WA (US); Christopher V. Grubbs, Spanaway, WA (US); Grant C. Zenkner, Puyallup, WA (US)

(73) Assignee: The Boeing Company, Chicago, IL (US)

( * ) Notice: Subject to any disclaimer, the term of this patent is extended or adjusted under 35 U.S.C. 154(b) by 125 days.

(21) Appl. No.: 11/939,713

(22) Filed: Nov. 14, 2007

(65) Prior Publication Data

US 2009/0123708 A1 May 14, 2009

(51) Int. Cl.
B29C 65/00 (2006.01)
B29C 47/00 (2006.01)

(52) U.S. Cl. .................. 156/285; 156/245; 156/307.1; 156/196; 156/227; 264/257; 264/258

(58) Field of Classification Search ................. 156/174, 156/202, 201, 200, 196, 285; B29C 70/34, B29C 70/44, 70/46

See application file for complete search history.

(56) References Cited

U.S. PATENT DOCUMENTS 4,512,836 A 4/1985 Tucci
5,538,589 A 7/1996 Jensen et al.

FOREIGN PATENT DOCUMENTS

EP 1231046 A2 * 8/2002
JP 04029833 A * 1/1992
WO PCT/US2008/080199 10/2008

* cited by examiner

Primary Examiner—Richard Crispino
Assistant Examiner—William P Bell
(74) Attorney, Agent, or Firm—Tung & Associates

(57) ABSTRACT

Three simple tools are used to both preform and mold a composite layup into a J-beam. A first composite charge is preformed into a C-channel using a first tool, and a second composite charge is formed into a Z-channel using both the first tool and a second tool. The C-channel and Z-channel are laid up between the first and second tools, following which a perform composite cap and third tool are added to complete the layup and the tool assembly. The layup may be molded using vacuum bagging techniques and subsequently cured while held in the tool assembly.

20 Claims, 5 Drawing Sheets

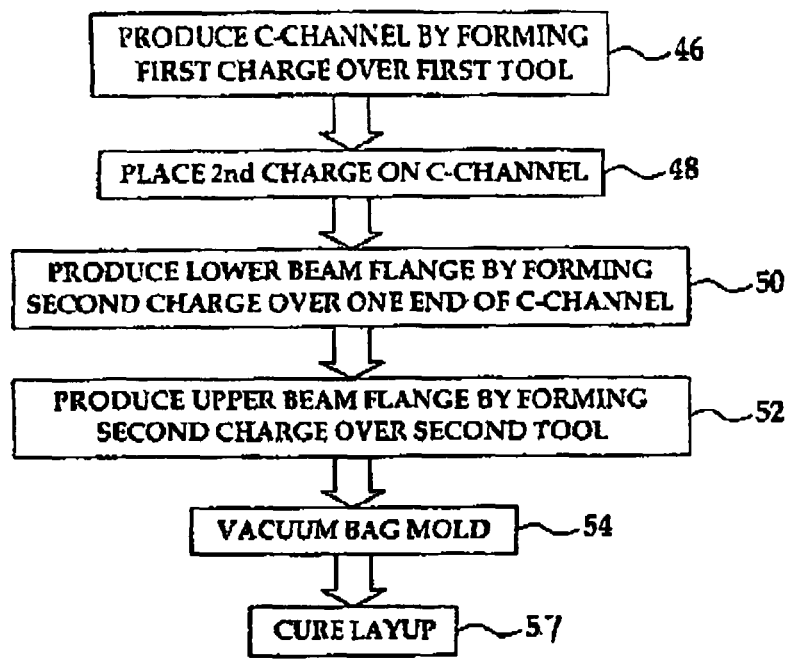
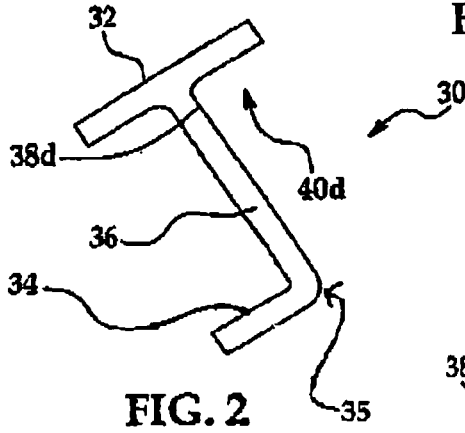
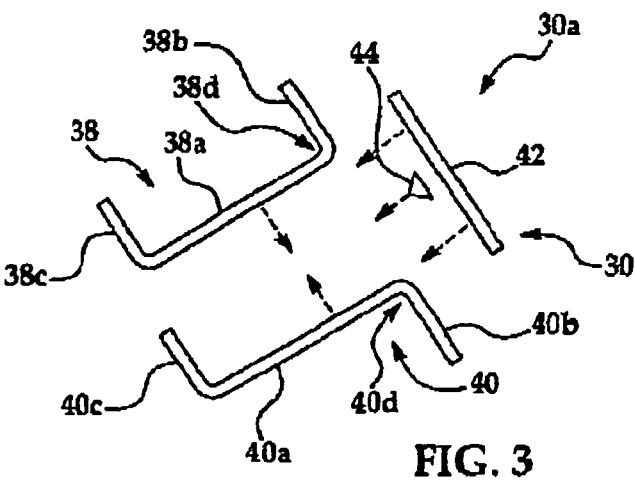

METHOD AND TOOLS FOR FABRICATING COMPOSITE BEAMS

TECHNICAL FIELD

This disclosure broadly relates to the fabrication of composite structures, and deals more particularly with a method and tools for fabricating composite beams, especially those having a nonsymmetrical cross section geometry, such as a "J" beam.

BACKGROUND

Beams formed from composite materials such as carbon fiber are used in a variety of vehicular applications to carry and distribute loads. For example, in aircraft applications, composite beams having a J-shaped cross section ("J-beam") may be used to support a floor within the fuselage, such as a floor in a cargo area or a passenger cabin. These beams may also find use in other applications, such as for example, without limitation, fuselages, wings, stabilizers and control surface skin supports, to name a few. Composite beams used in these applications must possess dimensional stability over a wide range of environmental conditions, while meeting other performance specifications, including load carrying ability and rigidity.

Composite J-beams may be fabricated by assembling a C-channel and a Z-channel and then installing a cap on the beam. Multiple steps and complex tooling may be required to form the features of the C-channel and Z-channel, while additional tools may be required to assemble, mold and cure the layup. This tooling may require tight tolerances in some areas, such as certain radii in order to assure that features of the beam are fully formed and meet specifications.

Accordingly, there is a need for a method and tools that permit cost-effective fabrication of J-beams using a minimum number of tools to shape or preform components of the layup, and subsequently mold the layup, while meeting design specifications. Embodiments of the disclosure are intended to satisfy this need.

SUMMARY

The disclosed embodiments provide a method and tools for fabricating composite beams, particularly J-beams, in which the cross section of the beam is generally J-shape. A set of matched tools for fabricating the beams includes a minimum number of simple components that are used to both preform composite charges into desired shapes such as C-channels and Z-channels, and to mold and cure the assembled layup. As a result of the simplicity of the tooling, J-beams may be economically manufactured that exhibit good dimensional stability and performance characteristics.

According to one disclosed embodiment, a method is provided for fabricating a composite beam having a J-shape cross section, comprising the steps of: producing a C-channel by forming a first composite charge over a first tool; moving a second composite charge into contact with the C-channel to form a layup; producing a first flange on one end of the beam by forming a first portion of the second composite charge over one end of the C-channel; producing a second flange on the other end of the beam by forming a second portion of the second composite charge over the second tool; and, curing the layup. The layup may be cured in the tools by orienting the web of the beam at an angle between 25 and 45 degrees relative to horizontal in order to improve compaction at a radius on the beam.

According to another disclosed embodiment, a method is provided for fabricating a composite beam having a J-shaped cross section, comprising the steps of: forming a C-channel using a first composite charge; forming a Z-channel using a second composite charge; assembling the C-channel and the Z-channel in a set of tooling to form a J-beam layup having a cap and a bottom flange connected by a web; and, placing the J-beam layup in a set of tooling with the plane of the web inclined from horizontal at an angle between approximately 25 and 45 degrees.

According to still another method embodiment, a composite J-beam may be fabricated by the steps comprising: preforming a first composite charge and a portion of a second composite charge using a first tool; placing the first and second preformed charges between the first and second tools; preforming another portion of the second composite charge using the second tool; molding the preformed first and second composite charges using the first and second tools; and, curing the molded charges while the charges are held between the first and second tools.

According to another embodiment, tooling is provided for fabricating a composite J-beam, comprising: a matched tooling assembly for preforming and molding a composite layup having a J-shaped cross section. The matched tooling assembly includes a first tool over which a first portion of the layup may be preformed into a C-channel, a second tool over which a second portion of the layup may be formed into a Z-channel, and, a third tool for compressing a third portion of the layup defining a cap on the J-beam.

According to another disclosed embodiment, tooling apparatus is provided for fabricating a composite J-beam having a bottom flange, a pair of top flanges connected to the bottom flange by a web, and a cap covering the top flanges. The tooling apparatus comprises: a first tool having three adjacent surfaces for preforming and molding portions of the bottom of the flange, the web and one of the flanges; a second tool having three adjacent tool surfaces for molding portions of the bottom flange, the web and the other top flange, and, a third tool having a tool surface for molding the cap. One of the three tool surfaces for molding a portion of the web may be inclined at an angle between approximately 25 and 45 degrees relative to horizontal.

Other features, benefits and advantages of the disclosed embodiments will become apparent from the following description of embodiments, when viewed in accordance with the attached drawings and appended claims.

BRIEF DESCRIPTION OF THE ILLUSTRATIONS

FIG. 1 is a flow diagram illustrating one method embodiment for fabricating a composite J-beam.

FIG. 2 is an end view illustrating a composite J-beam fabricated in accordance with the disclosed embodiments.

FIG. 3 is an exploded end view illustrating preformed components of a layup used to fabricate the J-beam shown in FIG. 2.

DETAILED DESCRIPTION

Figure 4:
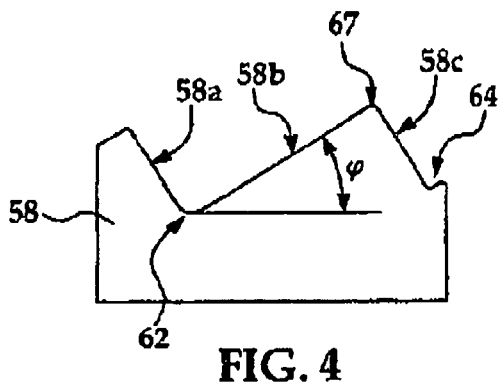
FIG. 4 is a cross sectional view of one tool used to fabricate the composite J-beam.

Referring first to FIGS. 1-6, embodiments of the disclosure relate to a method and tooling used to fabricate a composite J-beam 30 (FIG. 2) which may be used for example, and without limitation, to support a cargo floor (not shown) in a vehicle such as an aircraft (not shown). The J-beam 30 may also be used in other applications, such as for example, without limitation, fuselages, wings, stabilizers and control surface skin supports, to name a few. As best seen in FIG. 2, the J-beam 30 broadly comprises a top, double flange 32, connected to a single bottom flange 34 by a central web 36. The bottom flange 34 is connected to the web 36 by a radius 35. The J-beam 30 may be of any length, depending on the application, and may have a cross section that varies in dimension along its length. For example, the J-beam 30 may vary in thickness or have a variable gage along its length.

Figure 5:
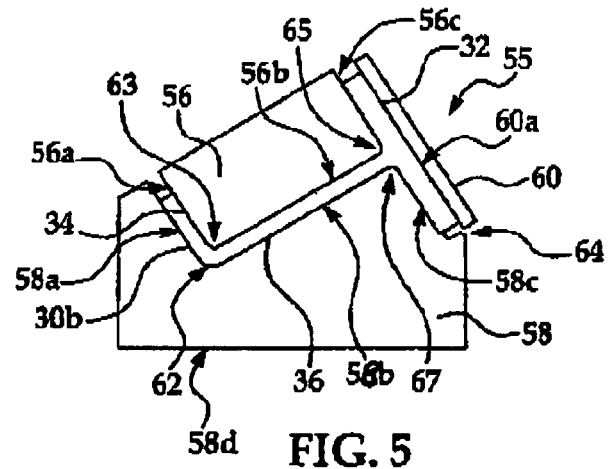
FIG. 5 is a cross sectional illustration of a layup in the assembled tooling used to vacuum bag mold and cure the layup.
Figure 6:
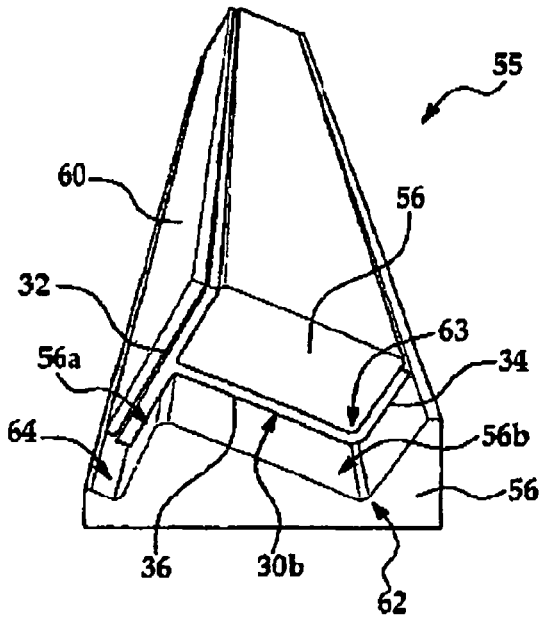
FIG. 6 is an isometric view of the tooling assembly shown in FIG. 5.

As shown in FIG. 3, the J-beam 30 may be formed from four preformed, composite charges 30a that are assembled into a layup 30b that is vacuum bag molded and cured in a tool assembly 55 (FIGS. 5 and 6). The composite charges 30a may each comprise a prepreg formed from any of various combinations of reinforcing fibers held in a resin, including for example, and without limitation, a carbon fiber epoxy. The layup 30b comprises a U-channel 38, a Z-channel 40, a cap 42 and a filler 44 sometimes also referred to as a "noodle". The U-channel 38 includes a web portion 38a connecting top and bottom flange portions 38b, 38c. Similarly, the 2-channel 40 includes a web portion 40a connecting top and bottom flange portions 40b, 40c. When laid up and placed in the tool assembly 55, flange portions 38b, 40b extend in opposite directions and are essentially coplanar, while flange portions 38c, 40c overlap so as to form the bottom flange 34 of the J-beam 30. The web portions 38a, 40a are stacked side-by-side to form the web 36 of the J-beam 30. The filler 44 may be placed in any gap (not shown) that may exist between the top flange portions 38b, 40b. The cap 42 is placed over the upper flange portions 38b, 40b, and together, form the top flange 32 of the J-beam 30.

The tool assembly 55 broadly includes a first tool 56, a second tool 58 and a third tool in the form of a flat caul plate 60. The first tool 56 is generally rectangular in cross section and includes three adjacent, flat tool surfaces 56a, 56b and 56c. Tool surfaces 56a and 56b are connected by a radius corner 63, while tool surfaces 56b and 56c are connected by a radius corner 6[[7]]5. When assembled as part of the tool assembly 55, the first tool 56 is disposed within the U-channel 38 portion of the layup 30b and thus provides tool surfaces 56a, 56b, 56c against which three corresponding surfaces of the layup 30b are compressed during the molding process.

The second tool 58 includes tool surfaces 58a, 58b, 58c which form a Z-pattern matching the shape of the Z-channel 40 (FIG. 3). Tool surfaces 58a and 58b are connected by a radius corner 62, while tool surfaces 58b and 58c are connected by a radius corner 67. Tool surface 58c may terminate in a lip 64, if desired, which acts as a support for the caul plate 60. Tool 58 may include a flat base 58d which supports the tool assembly 55 on any suitable surface (not shown). Tooling surfaces 58a, 58b are connected through a radius corner 62 where it is important to assure that sufficient compaction of the layup 30b is achieved and that bridging of the layup 30b during curing is avoided. In order to increase compaction of the layup 30b in the area of the radius corner 62 during curing, the tool surfaces 58a, 58b, 58c may be oriented such that the radius corner 62 is positioned below the bottom flange 34 and the web 36, relative to horizontal. This orientation is achieved by inclining the tool surface 58b at an angle φ relative to horizontal that may be between approximately 25 and 45 degrees. As a result of this angle of inclination, compaction forces are distributed during the vacuum bag molding process so that possible bridging of the prepreg at the radius corner 62 is prevented, which in turn may avoid resin starvation at the radius corner 62. Also, as a result of the inclination angle, gravity may aid the resin to flow into the area of the radius corner 62. The inclination angle also results in gravity applying forces to the charges that tends to self-index the layup 30b in the tool set 55 during the assembly process, so that the radius area 63 of the layup 30b is drawn down into the radius corner 62 of the second tool 58.

The caul plate 60 is essentially rectangular in cross section and may include a flat lower tool surface 60a that bears against and compresses the flat preform charge 42 which bears against the upper flanges 38b, 40b (FIG. 3). The radius corners 65, 67 produce corresponding radii 38d, 40d between the cap 32 and web 36 (see FIGS. 2 and 3).

FIG. 1 shows the steps of one method for forming the J-beam 30 using the tool set 55 shown in FIG. 5. Referring particularly now to FIGS. 1 and 7a-7h, at step 46, the C-channel 38 is shaped by preforming a first flat, uncured prepreg composite charge 38 over the first tool 56. Next, at step 48, a second flat, uncured prepreg composite charge is placed over the C-channel 38. As shown at step 50, the lower beam flange 34 of the layup 30b is produced by forming the second flat charge over one end 38c of the C-channel 38. At 52, one of the upper beam flanges 40b is produced by forming the second composite charge over tool surface 58c of the second tool 58. Finally, the layup 30b is molded using the tool assembly 55 and vacuum bagging techniques at step 54, following which the layup 30b is cured at step 57. Forming of the charges 30a may be performed using conventional hot forming techniques, carried out, for example and without limitation, under a vacuum bag by applying heat to the charges 30a using an oven, heat lamps or heat blankets (not shown).

Figure 7:
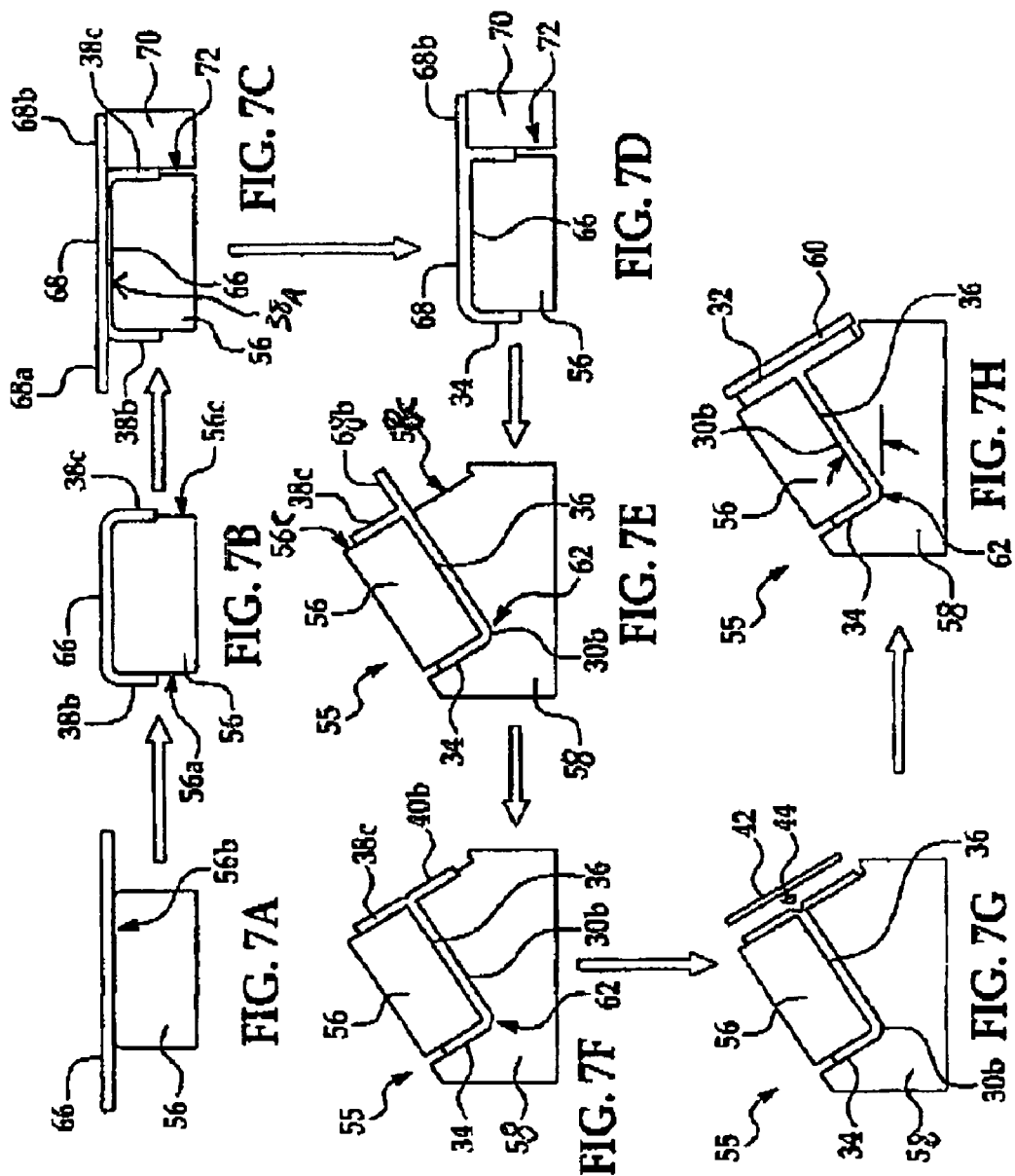
FIGS. 7a-7h are cross sectional views illustrating a method for fabricating a composite J-beam.
Figure 8:
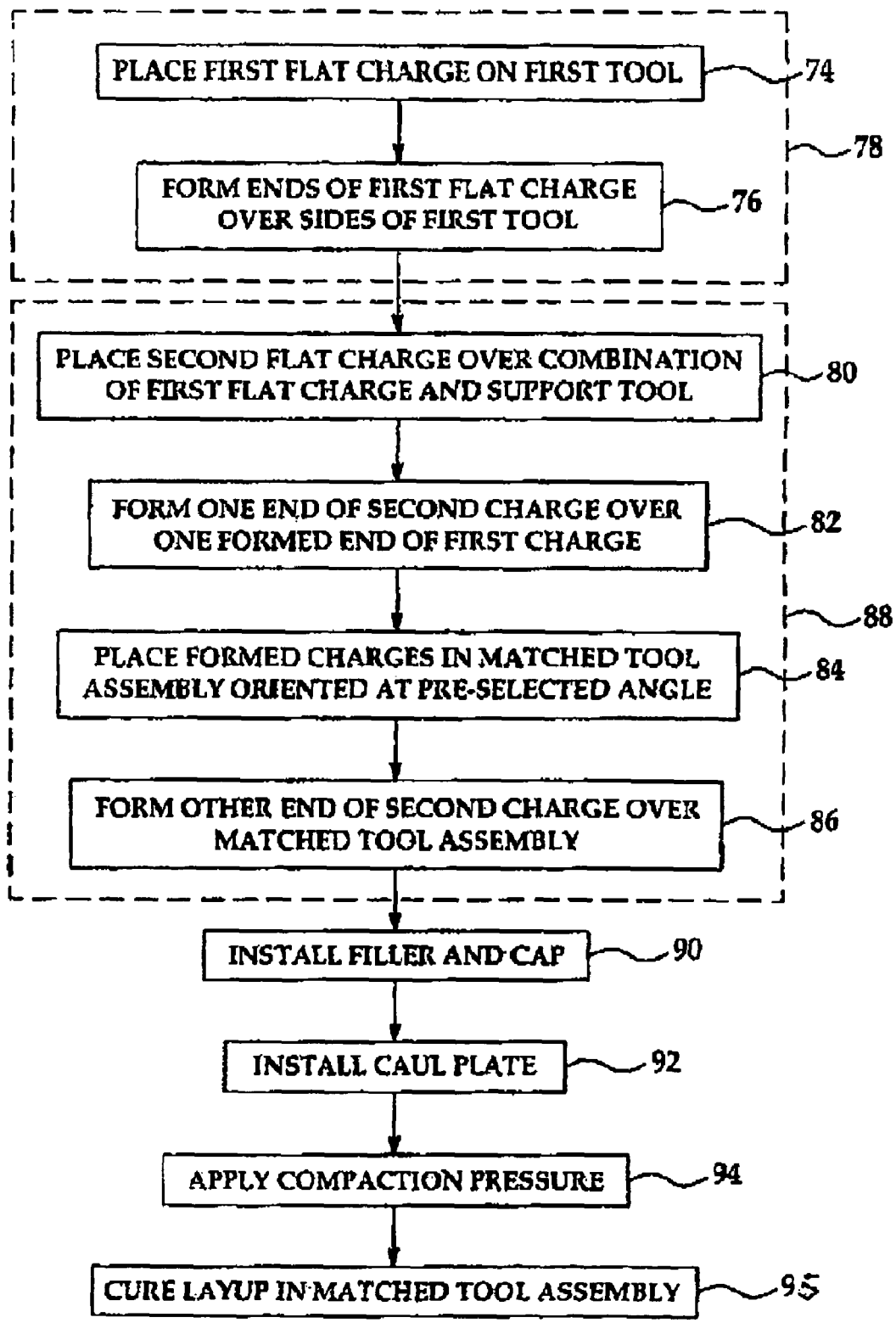
FIG. 8 is a flow diagram illustrating the steps of another method embodiment.

Another embodiment of the method of fabricating the J-beam 30 is shown in FIG. 8 which will now be described with reference also to FIGS. 7a-7h. Beginning at step 74 (FIG. 7a) a flat, uncured prepreg composite charge 66 is placed on the flat tool surface 56b of the first tool 56. Next, at step 76, the ends of the flat charge 66 are formed or bent down over the sides of tool surfaces 56a, 56c to form the flange portions 38b, 38c. These first two steps 74, 76 provide a process 78 for forming the C-channel 38. The next series of steps 88 will result in the formation of the Z-channel 40. Beginning at step 80, a second flat, uncured prepreg composite charge 68 which may comprise a suitable prepreg, is placed over the web portion 38a of the U-channel 38. One end 68a of the second composite charge 68 overhangs the channel portion 38b, while the opposite edge 68b is supported by a flat tool 70 which is slightly spaced from the first tool 56 to form a gap 72 for receiving the flange 38c. Next, at step 82, shown in FIG. 7d, the outer edge 68a of the second charge 68 is formed or bent downwardly over the flange portion 38b while the C-channel 38 remains supported by the first tool 56.

At step 84, the fully formed U-channel 38 and the partially formed Z-channel 36 are placed in the tool assembly 55, as shown in FIG. 7e, with the web portion 36 of the layup 30b held at the angle .phi. (see FIG. 4) which, as previously described may be between approximately 25 and 45 degrees. At step 86 (FIG. 7f) the outer edge 68b is bent or formed downwardly onto the tool surface 58c thereby producing the upper flange 40b of the Z-channel 40.

Next, at step 90, as shown in FIG. 7g, the filler 44 and cap 42 are installed, following which, as shown at step 92 (FIG. 7h) the caul plate 60 is placed over the cap 42. Then, at step 94, compaction pressure is applied to the tool assembly using, for example and without limitation, conventional vacuum bagging techniques. The compacted layup 30b is then cured, as shown at 95, in the tool assembly 55 using, for example and without limitation, an autoclave (not shown).

Figure 9:
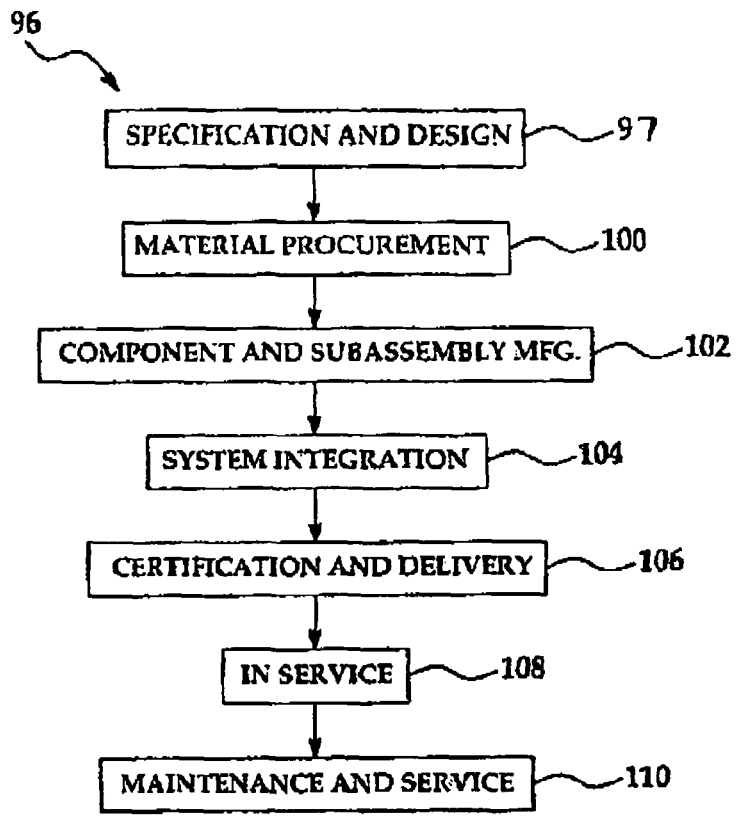
FIG. 9 is a flow diagram of an aircraft production and service methodology.
Figure 10:
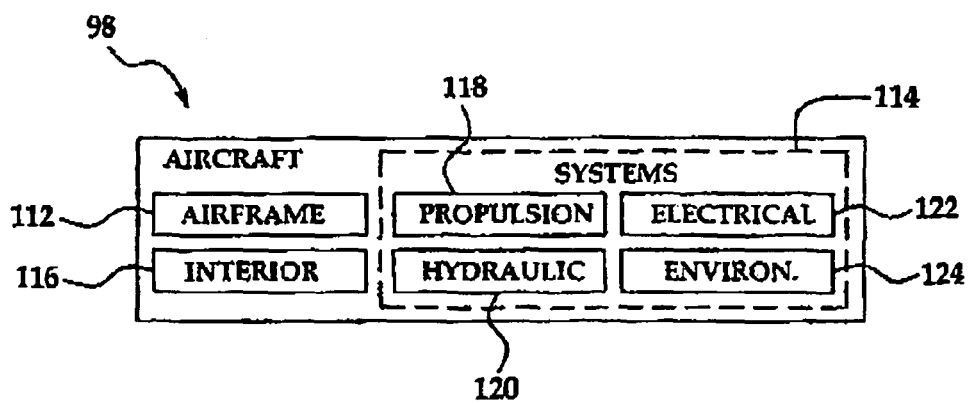
FIG. 10 is a block diagram of an aircraft.

Embodiments of the disclosure may find use in a variety of potential applications, particularly in the transportation industry, including for example, aerospace and automotive applications. Thus, referring now to FIGS. 9 and 10, embodiments of the disclosure may be used in the context of an aircraft manufacturing and service method 96 as shown in FIG. 9 and an aircraft 98 as shown in FIG. 10. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 96 may include specification and design 97 of the aircraft 116 and material procurement 100. During production, component and subassembly manufacturing 102 and system integration 104 of the aircraft 98 takes place. Thereafter, the aircraft 98 may go through certification and delivery 106 in order to be placed in service 108. While in service by a customer, the aircraft 98 is scheduled for routine maintenance and service 110 (which may also include modification, reconfiguration, refurbishment, and so on).

Each of the processes of method 96 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 98 produced by exemplary method 96 may include an airframe 112 with a plurality of systems 114 and an interior 116. Examples of high-level systems 114 include one or more of a propulsion system 118, an electrical system 122, a hydraulic system 120, and an environmental system 124. Any number of other systems may be included. Although an aerospace example is shown, the principles of the disclosure may be applied to other industries, such as the automotive industry.

Apparatus and methods embodied herein may be employed during any one or more of the stages of the production and service method 96. For example, components or subassemblies corresponding to production process 102 may be fabricated or manufactured in a manner similar to components or subassemblies produced while the aircraft 98 is in service. Also, one or more apparatus embodiments, method embodiments, or a combination thereof may be utilized during the production stages 102 and 104, for example, by substantially expediting assembly of or reducing the cost of an aircraft 98. Similarly, one or more of apparatus embodiments, method embodiments, or a combination thereof may be utilized while the aircraft 98 is in service, for example without limitation, to maintenance and service 110.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of fabricating a composite beam having a J-shape cross section, comprising the steps of:
   (A) producing a C-channel by forming a first composite charge over a first tool;
   (B) moving a second flat composite charge into contact with the C-channel produced in step (A) to form a layup while said C-channel is supported over said first tool;
   (C) producing a first flange on one end of the beam by forming a first portion of the second flat composite charge over one end of the C-channel while said C-channel is supported over said first tool;
   (D) producing a second flange on the other end of the beam by forming a second portion of the second composite charge over a second tool while said beam is supported between said first and second tool; and,
   (E) curing the layup while said layup is supported between said first and second tools.

2. The method of claim 1, wherein step (A) includes forming opposite ends of the first composite charge over opposite sides of the first tool.

3. The method of claim 1, further comprising the step of: assembling the layup and the first and second tools.

4. The method of claim 1, wherein step (E) includes holding the layup in the first and second tools such that a web of the J-beam is oriented relative to horizontal at an angle of between approximately 25 and 45 degrees.

5. The method of claim 1, further comprising the step of: heating the first charge before step (A) is performed.

6. The method of claim 1, further comprising the step of: heating the second charge before steps (C) and (D) are performed.

7. The method of claim 1, further comprising the step of: forming a cap over the second flange after step (D) has been performed, using a third composite charge.

8. The method of claim 1 wherein said composite beam being a part of an aircraft subassembly.

9. The method of claim 1 wherein said composite beam being a part of a vehicle subassembly.

10. The method of claim 1, wherein said first flange comprises a bottom portion of said J-shape and said second flange comprises a top portion of said J-shape.

11. A method of fabricating a composite beam having a J-shape cross section, comprising the steps of:
   (A) forming a C-channel using a first flat composite charge supported over a first tool;
   (B) forming a Z-Channel using a second flat composite charge in contact with said C-channel and supported between said first tool and a second tool;
   (C) assembling the C-channel and the Z-channel in a set of tooling comprising said first and second tools to form a J-beam layup having a cap and a bottom flange connected by a web;
   (D) placing the J-beam layup in said set of tooling with the plane of the web inclined from horizontal at an angle of between approximately 25 and 45 degrees; and,
   (E) curing the J-beam layup while the J-beam assembly is held in the set of tooling.

12. The method of claim 11, wherein step (A) is performed by forming opposite ends of the first composite charge over opposite sides of said first tool.

13. The method of claim 11, wherein step (B) is performed by:
   placing the second charge on the C-channel, bending an end of the second charge over one end of the C-channel formed in step (A) to form the bottom flange, and, bending an opposite end of the second charge over said second tool.

14. The method of claim 11, wherein step (A) and (B) include heating the first and second charges.

15. The method of claim 11, further comprising the step of: compacting the J-beam layup while the J-beam layup is held in the set of tooling.

16. The method of claim 11 wherein said composite beam being a part of an aircraft subassembly.

17. The method of claim 11 wherein said composite beam being a part of a vehicle subassembly.

18. The method of claim 11, wherein said C-channel and said Z-channel comprise a top and bottom portion of said J-shape.

19. A method of fabricating a composite J-beam, comprising the steps of:
(A) preforming a first flat composite charge and a portion of a second flat composite charge using a first tool, including bending edges of the first composite charge over opposite sides of the first tool to form a C-channel, and bending one edge of the flat second composite charge over one of the bent edges of the first composite charge;
(B) placing the first and second charges preformed in step (A) between the first tool and a second tool;
(C) preforming another portion of the second composite charge using the second tool to form a Z-channel;
(D) placing a third composite charge on the first and second composite charge after step (C) has been performed; and,
(E) bringing a third tool into contact with the third composite charge after step (D) has been completed to form an assembled combination comprising the first, second and third preformed composite charges in contact with said first, second and third tools;
(F) placing the assembled combination in a vacuum bag;
(G) generating a vacuum in the vacuum bag to mold the first, second and third preformed composite charges into the beam; and,
(H) curing the molded beam while the charges are held between the first, second and third tools.

20. The method of claim 19, wherein said bent edges of said first composite charge formed over said first tool comprise a top and bottom portion of a J-shape, and said second composite charge portion formed over said second tool comprises a top portion of said J-shape.

* * * * *